United States Patent
Gonzalez et al.

(10) Patent No.: US 6,840,987 B1
(45) Date of Patent: Jan. 11, 2005

(54) AIR FILTERING APPARATUS

(76) Inventors: Eliu P. Gonzalez, 7104 Minnesota, St. Louis, MO (US) 63111; Eliu M. Gonzalez, 7104 Minnesota, St. Louis, MO (US) 63111

( * ) Notice: Subject to any disclaimer, the term of this patent is extended or adjusted under 35 U.S.C. 154(b) by 113 days.

(21) Appl. No.: 10/339,890

(22) Filed: Jan. 10, 2003

(51) Int. Cl.[7] .............................................. B01D 47/06
(52) U.S. Cl. .............................. 96/274; 96/277; 96/296; 96/361; 96/363; 96/364
(58) Field of Search .................. 95/199, 200, 201, 95/214, 210, 211, 224, 225; 96/270, 273, 274, 276, 277, 280, 296, 297, 298, 355, 361, 363, 364

(56) References Cited

U.S. PATENT DOCUMENTS

| | | | | |
|---|---|---|---|---|
| 1,795,161 A | * | 3/1931 | Brabbee | 96/294 |
| 1,966,280 A | * | 7/1934 | Bingman | 96/357 |
| 2,057,579 A | * | 10/1936 | Franz | 96/233 |
| 2,143,979 A | * | 3/1939 | Feinberg | 96/277 |
| 2,197,004 A | * | 4/1940 | Myers | 96/365 |
| 3,090,179 A | * | 5/1963 | Powell | 96/294 |
| 3,237,381 A | * | 3/1966 | Hvostoff et al. | 95/198 |
| 3,957,464 A | * | 5/1976 | Teller | 95/196 |
| 4,049,399 A | * | 9/1977 | Teller | 95/36 |
| 4,222,748 A | * | 9/1980 | Argo et al. | 95/64 |
| 4,231,768 A | | 11/1980 | Seibert et al. | |
| D281,618 S | | 12/1985 | Grube | |
| 5,704,954 A | | 1/1998 | Takagi | |
| 5,797,980 A | | 8/1998 | Fillet | |
| 5,800,585 A | | 9/1998 | Choi | |
| 5,879,434 A | * | 3/1999 | Kiss | 95/199 |
| 6,036,755 A | | 3/2000 | Weng | |
| 6,350,302 B1 | * | 2/2002 | Hallstead, Sr. | 96/240 |
| 6,478,859 B1 | * | 11/2002 | Ferlin et al. | 96/236 |

* cited by examiner

Primary Examiner—Duane S. Smith

(57) ABSTRACT

An air filtering apparatus for purifying air. The air filtering apparatus includes an enclosure for coupling to ducting of a ventilation system. The enclosure has an interior defined by a top wall, a bottom wall, a pair of side walls, a first end wall, and a second end wall. A plurality of filters comprises a pair of wet filters and a pair of dry filters positioned in the interior. A pair of pump members supplies water from an enclosure reservoir to each of the wet filters. A supply assembly supplies water to the enclosure reservoir. A drain assembly drains the enclosure reservoir at preset intervals. A fan member forces exterior air through each of the filter members and outwardly through a duct aperture in the first end wall. A control assembly controls each of the pump members and the drain assembly to coordinate a purge sequence of the enclosure reservoir.

19 Claims, 4 Drawing Sheets

AIR FILTERING APPARATUS

BACKGROUND OF THE INVENTION

1. Field of the Invention

The present invention relates to air filters and more particularly pertains to a new air filtering apparatus for purifying air.

2. Description of the Prior Art

The use of air filters is known in the prior art. U.S. Pat. No. 6,036,755 describes a water filtering type air cleaning unit. Another type of air filter is U.S. Pat. No. 5,704,954 which discloses an air purification apparatus.

While these devices fulfill their respective, particular objectives and requirements, the need remains for a system that utilizes a combination of self-cleaning wet filters, and dry filters.

SUMMARY OF THE INVENTION

The present invention meets the needs presented above by the utilization of water pumps to force water down through a pair of wet filters for the dual purpose of added purification of the air passing through, and continuous cleaning of the wet filters. The air then passes through a pair of dry filters before entering the building's ventilation system. The impurities are collected in a reservoir which is periodically purged and refilled automatically.

Still yet another object of the present invention is to provide a new air filtering apparatus that is adaptable to most typical central air conditioning systems and forced air furnaces and heat pumps.

Even still another object of the present invention is to provide a new air filtering apparatus that would be able to extract particulates, as well as organic chemicals and related pollutants, while its self-flushing design would reduce maintenance to the occasional replacement of it two activated carbon filters.

To this end, the present invention generally comprises an enclosure for coupling to ducting of a ventilation system. The enclosure has an interior defined by a top wall, a bottom wall, a pair of side walls, a first end wall, and a second end wall. A plurality of filters comprises a pair of wet filters and a pair of dry filters positioned in the interior. A pair of pump members supplies water from an enclosure reservoir to each of the wet filters. A supply assembly supplies water to the enclosure reservoir. A drain assembly drains the enclosure reservoir at preset intervals.

A fan member forces exterior air through each of the filter members and outwardly through a duct aperture in the first end wall.

A control assembly controls each of the pump members and the drain assembly to coordinate a purge sequence of the enclosure reservoir.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
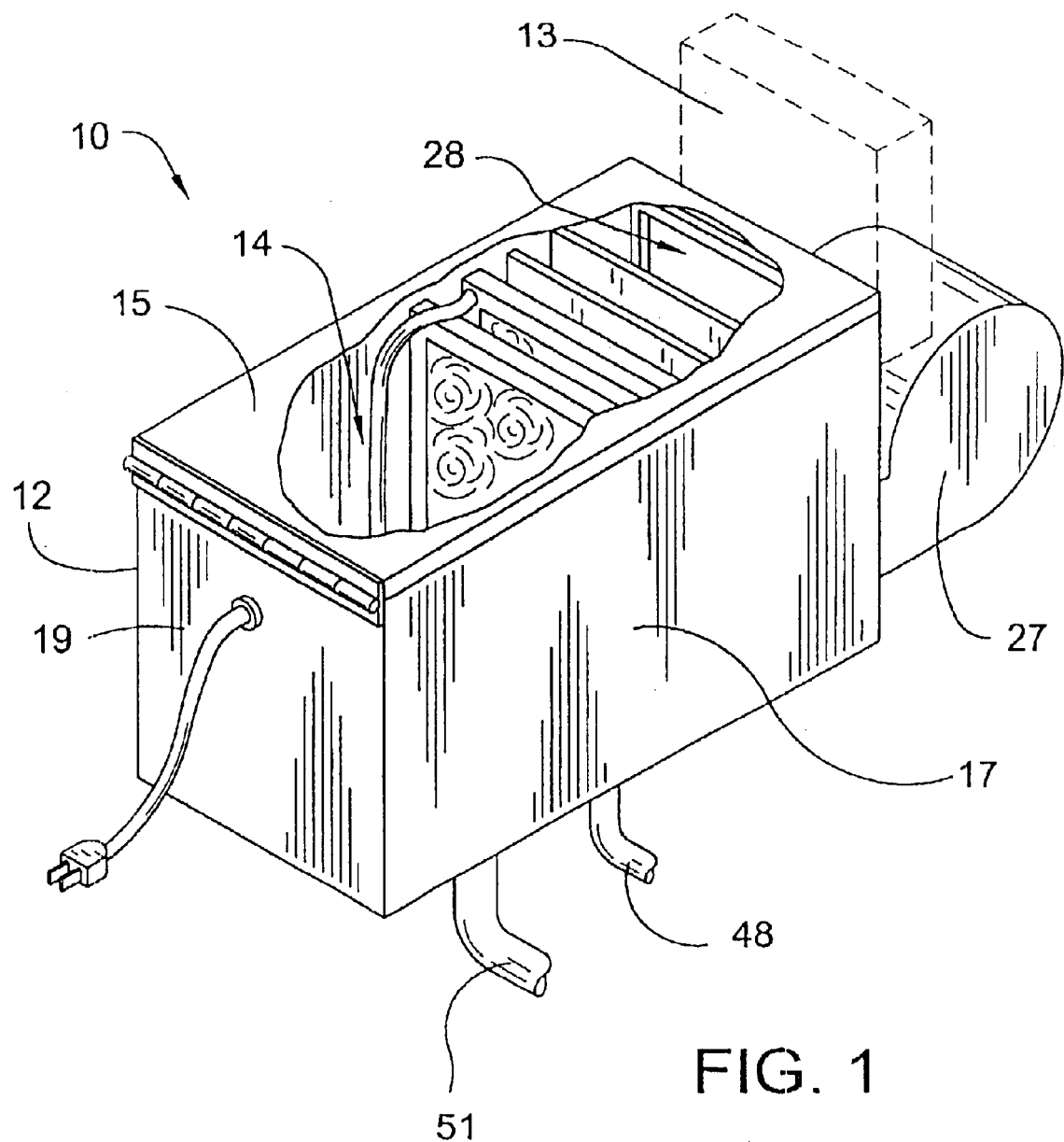
FIG. 1 is a schematic perspective view of a new air filtering apparatus according to the present invention.
Figure 2:
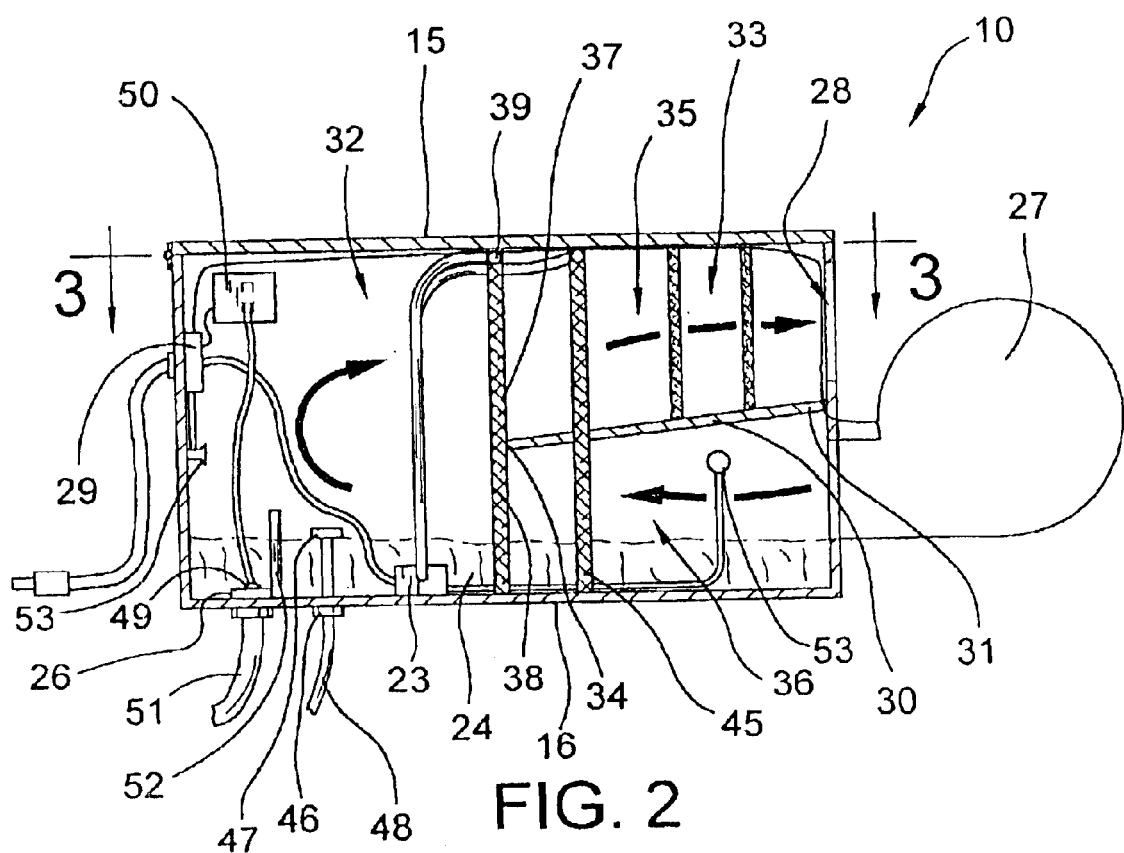
FIG. 2 is a schematic cross-sectional side view of the present invention.
Figure 3:
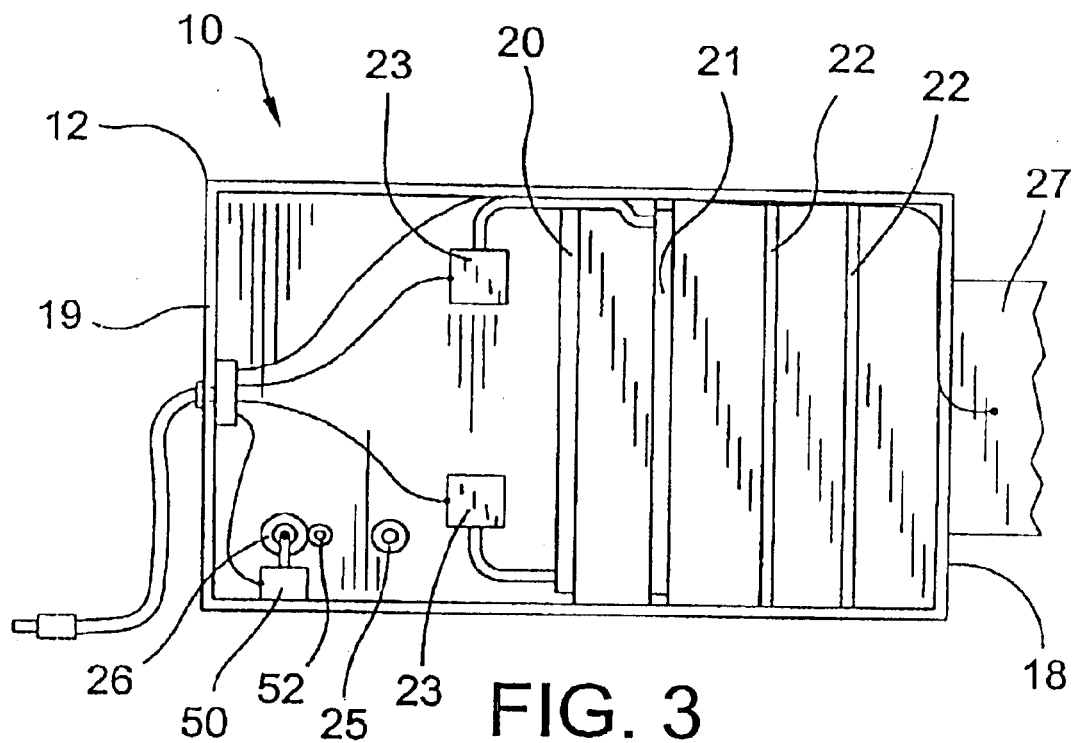
FIG. 3 is a schematic top view of the present invention without the top wall.
Figure 4:
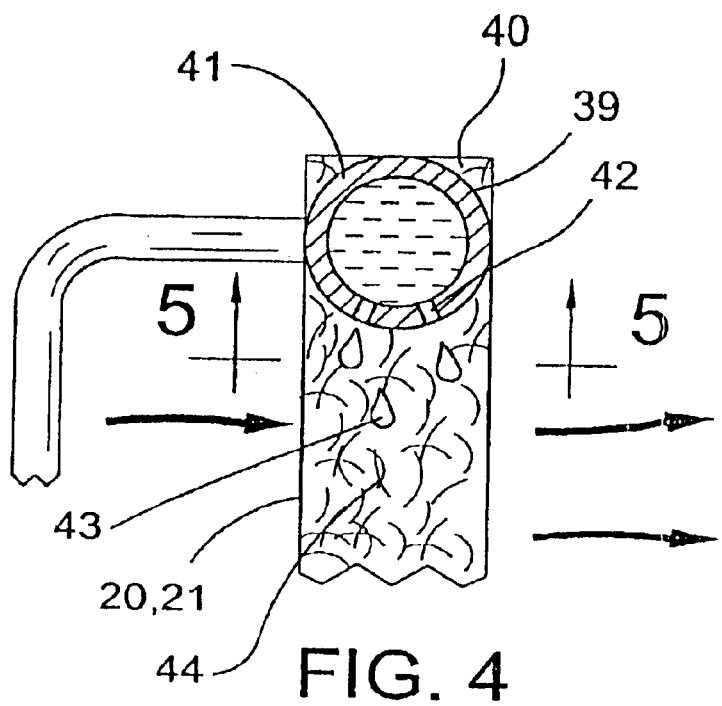
FIG. 4 is a schematic cross-sectional side view of a wet filter and the dispersing member of the present invention.
Figure 5:
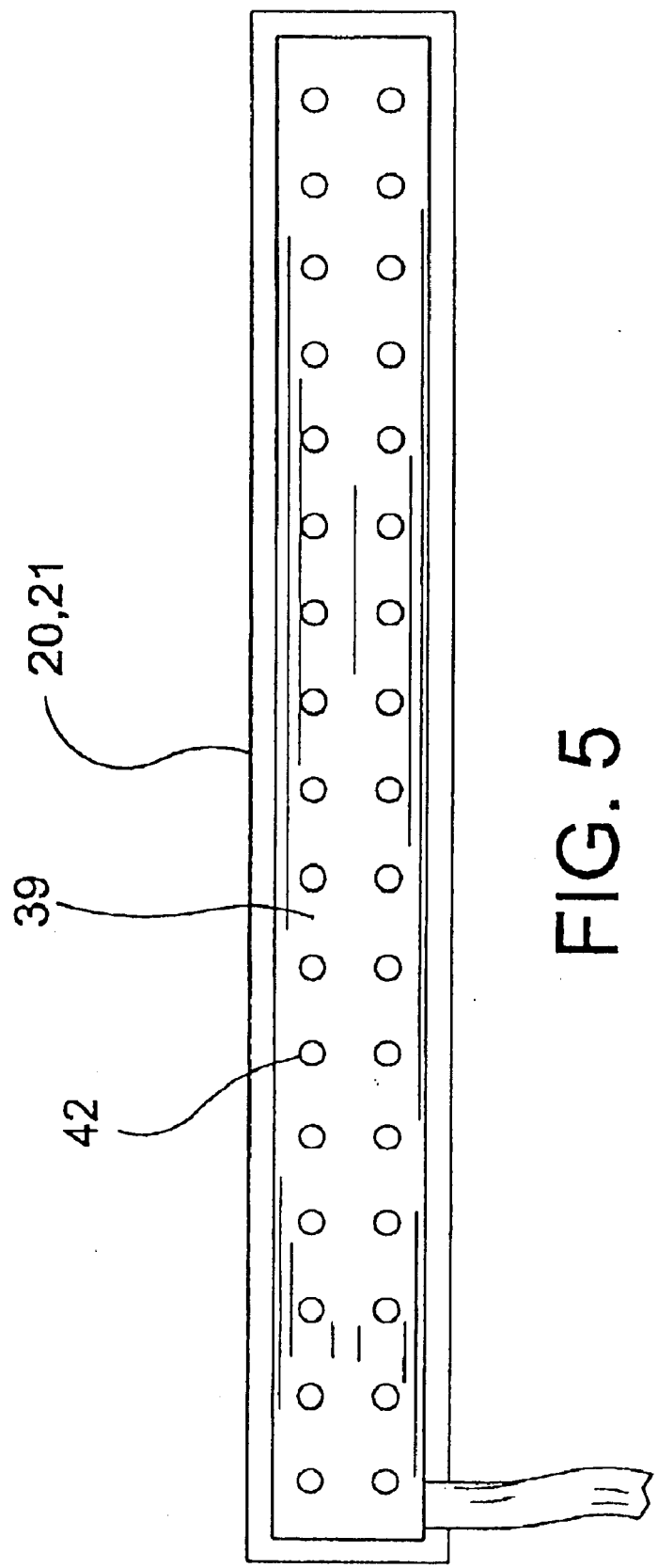
FIG. 5 is a schematic cross-sectional bottom view of a wet filter as taken along the sectional lines 5—5 in FIG. 4 of the present invention.

With reference now to the drawings, and in particular to FIGS. 1 through 5 thereof, a new air filtering apparatus embodying the principles and concepts of the present invention and generally designated by the reference numeral 10 will be described.

As best illustrated in FIGS. 1 through 5, the air filtering apparatus 10 generally comprises an enclosure 12 for coupling to ducting 13 of a ventilation system. The enclosure 12 has an interior 14. The enclosure 12 has a top wall 15, a bottom wall 16, a pair of side walls 17, a first end wall 18, and a second end wall 19. The walls define the interior 14.

A plurality of filters extracts impurities from air passing therethrough. The plurality of filters comprises a first wet filter 20, a second wet filter 21, and a pair of dry filters 22. The dry filters consisting of carbon activated filters. Each of the filters is positioned in the interior 14 of the enclosure 12 and is oriented generally parallel to the end walls.

A pair of pump members 23 supplies water from an enclosure reservoir 24 to each of the wet filters. Each of the pump members 23 is mounted on the bottom wall 16 of the enclosure 12 and is positioned in the interior 14. The pump members 23 are submersed in the enclosure reservoir 24 and are fluidly coupled to the wet filters.

A supply assembly 25 for supplying water to the enclosure reservoir 24 in the interior 14 is mounted on the bottom wall 16 of the enclosure 12.

A drain assembly 26 for draining the enclosure reservoir 24 is mounted on the bottom wall 16 of the enclosure 12.

A fan member 27 forces exterior air through each of the filters and outwardly through a duct aperture 28 in the first end wall 18.

A control assembly 29 controls each of the pump members 23 and the drain assembly 26 to coordinate a purge sequence of the enclosure reservoir 24. The control assembly 29 is electrically couplable to a standard power supply.

The enclosure 12 includes a partition wall 30 that is attached to and extends between the side walls 17. A first end 31 of the partition wall 30 is attached to the first end wall 18 at a point between the duct aperture 28 and the fan member 27 and extends towards the second end wall 19 and is angled downward towards the bottom wall 16 to facilitate drainage of the water to the enclosure reservoir 24.

Each of the wet filters extends between the bottom wall 16, the top wall 15, and the side walls 17. The first wet filter 20 is centrally positioned between the end walls and defines a first area 32 and a second area 33 of the interior 14.

A second end 34 of the partition wall 30 is mounted on the first wet filter 20 such that an upper compartment 35 and a lower compartment 36 in the second area 33 of the interior 14 are defined.

The second wet filter 21 is positioned between the first wet filter 20 and the second end wall 19.

Each of the wet filters has an upper portion 37 that is positioned above the partition wall 30, and a lower portion 38 that is positioned below the partition wall 30.

Each of the wet filters includes a dispersing member 39 for injecting the water from the pump members 23 into a top end 40 of the wet filters.

One each of the dispersing members 39 is mounted on and extends across the top end 40 of the wet filters. Each of the dispersing members 39 comprises an elongate tubular member 41 that has a plurality of filter apertures 42 for permitting the water to pass downwardly through to each of the wet filters.

A continuous flow of water passes downward through each of the wet filters 20, 21 to facilitate the purification of the air passing therethrough when impurities become attached to water particles 43 and a filter membrane 44 of the wet filters while simultaneously moving the impurities downward out a bottom end 45 of each of the wet filters and into the enclosure reservoir 24 such that each of the wet filters remains generally cleansed.

Each of the dry filters 22 extends between the top wall 15, the side walls 17, and the partition wall 30 and is positioned in the upper compartment 35 of the interior 14.

The supply assembly 25 comprises an inlet valve 46 and a float member 47. The inlet valve 46 is fluidly coupled to a water supply 48. Water from the water supply 48 is permitted to pass through the inlet valve 46 until the float member 47 biases the inlet valve 46 into a closed position when a predetermined water level of the enclosure reservoir 24 in the interior 14 is reached.

The drain assembly 26 comprises an outlet valve 49 and an actuator member 50 for actuating the outlet valve 49. The outlet valve 49 is fluidly coupled to a drain tube 51. The actuator member 50 is operationally coupled to the outlet valve 49, and electrically coupled to the control assembly 29. When the control assembly 29 actuates the actuator member 50, the outlet valve 49 is biased into an open position permitting the enclosure reservoir 24 to drain.

The drain assembly 26 includes an overflow member 52 for draining excess water in the enclosure reservoir 24. The overflow member 52 is mounted to the outlet valve 49 and is in fluid communication with the drain tube 51.

The enclosure reservoir 24 is drained upon periodic activation of the drain assembly 26 by the control assembly 29 for the purpose of purging accumulated impurities from each of the wet filters then is automatically re-supplied by the supply assembly 25.

The fan member 27 is mounted on the second end wall 19 of the enclosure 12 and is fluidly coupled to the interior 14 such that exterior air is forced into the lower compartment 36 of the second area 33, through the lower portions 38 of the wet filters into the first area 32 then through the upper portions 37 of the wet filters and each of the dry filters 22 and exits through the duct aperture 28 into the ducting 13 of the ventilation system. The fan member 27 is electrically coupled to the control assembly 29.

In use, the enclosure 12 is coupled to the ducting 13 of an existing ventilation system of a building or structure. The supply assembly 25 fills the enclosure reservoir 24 to a preset level determined by the float member 47. The fan member 27 turns on when the control assembly 29 senses a main fan of the ventilation system turning on and forces air through the filters to purify the air prior to being cycled through the ventilation system. The pump members 23 pump water through the wet filters whenever the fan member 27 is running as determined by the control assembly 29. At predetermined time intervals when the controller senses that the fan member 27 is not operating, the actuator member 50 is actuated to purge the enclosure reservoir 24, which is automatically refilled by the supply assembly 25.

In a further embodiment, the apparatus 10 may also include a pair of sprinkler members 53 positioned on an interior 14 of the enclosure 12. The pair of sprinkler members 53 sprays water from the supply assembly into an interior 14 of the enclosure 12 ahead of and behind the plurality of filters.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An air filtering apparatus for purifying air, said apparatus comprising:

an enclosure for coupling to ducting of a ventilation system, said enclosure having an interior, said enclosure having a top wall, a bottom wall, a pair of side walls, a first end wall, and a second end wall, said walls defining said interior;

a plurality of filters for extracting impurities from air passing therethrough, said plurality of filters comprising a first wet filter, a second wet filter, and a pair of dry filters, each of said filters being positioned in said interior of said enclosure and being oriented generally parallel to said end walls;

a pair of pump members for supplying water from an enclosure reservoir to each of said wet filters, each of said pump members being mounted on said bottom wall of said enclosure and being positioned in said interior, said pump members being submersed in said enclosure reservoir and being fluidly coupled to said wet filters;

a supply assembly for supplying water to said enclosure reservoir in said interior, said supply assembly being mounted on said bottom wall of said enclosure;

a drain assembly for draining said enclosure reservoir, said drain assembly being mounted on said bottom wall of said enclosure;

a fan member for forcing exterior air through each of said filters and outwardly through a duct aperture in said first end wall;

a control assembly for controlling each of said pump members and said drain assembly to coordinate a purge sequence of said enclosure reservoir; and said enclosure including a partition wall being attached to and extending between said side walls a first end of said partition wall being attached to said first end wall at a point between said duct aperture and said fan member and extending towards said second end wall and being angled downwardly towards said bottom wall to facilitate drainage of the water to said enclosure reservoir.

2. The air filtering apparatus for purifying air as set forth in claim 1, further comprising each of said wet filters extending between said bottom wall, said top wall, and said side walls, said first wet filter being centrally positioned between said end walls and defining a first area and a second area of said interior.

3. The air filtering apparatus for purifying air as set forth in claim 2, further comprising a second end of said partition wall being mounted on said first wet filter such that an upper compartment and a lower compartment in said second area of said interior are defined.

4. The air filtering apparatus for purifying air as set forth in claim 1, further comprising said second wet filters being positioned between said first wet filter and said second end wall.

5. The air filtering apparatus for purifying air as set forth in claim 1, further comprising each of said wet filters having an upper portion being positioned above said partition wall and a lower portion being positioned below said partition wall.

6. The air filtering apparatus for purifying air as set forth in claim 1, further comprising each of said wet filters including a dispersing member for injecting the water from said pump members into a top end of said wet filters.

7. The air filtering apparatus for purifying air as set forth in claim 6, further comprising one each of said dispersing members being mounted on and extending across said top cad of said wet filters, each of said dispersing members comprising an elongate tubular member having a plurality of filter apertures for permitting the water to pass downwardly through to each of said wet filters.

8. The air filtering apparatus for purifying air as set forth in claim 1, wherein a continuous flow of water passing downwardly through each of said wet filters facilitates the purification of the air passing therethrough when impurities become attached to water particles and filter membrane while simultaneously moving the impurities downwardly out a bottom end of each of said wet filters and into said enclosure reservoir such that each of said wet filters remains generally cleansed.

9. The air filtering apparatus for purifying air as set forth in claim 3, further comprising each of said dry filters extending between said top wall, said side walls, and said partition wall and being positioned in said upper compartment of said interior.

10. The air filtering apparatus for purifying air as set forth in claim 1, further comprising said supply assembly comprising an inlet valve and a float member, said inlet valve being fluidly coupled to a water supply, wherein water from the water supply is permitted to pass through said inlet valve until said float member biases said inlet valve into a closed position when a predetermined water level of said enclosure reservoir in said interior is reached.

11. The air filtering apparatus for purifying air as set forth in claim 1, further comprising said drain assembly comprising an outlet valve and an actuator member for selectively actuating said outlet valve, said outlet valve being fluidly coupled to a drain tube, said actuator member being operationally coupled to said outlet valve and being electrically coupled to said control member.

12. The air filtering apparatus for purifying air as set forth in claim 11, wherein when said actuator member is actuated, said outlet valve is biased into an open position permitting said enclosure reservoir to drain.

13. The air filtering apparatus for purifying air as set forth in claim 11, further comprising said drain assembly including an overflow member for draining excess water in the enclosure reservoir, said overflow member being mounted to said outlet valve and being in fluid communication with the drain tube.

14. The air filtering apparatus for purifying air as set forth in claim 1, wherein said enclosure reservoir is drained upon periodic activation of said drain assembly for the purpose of purging accumulated impurities from each of said wet filters then is automatically re-supplied by said supply assembly.

15. The air filtering apparatus for purifying air as set forth in claim 3, further comprising said fan member being mounted on said second end wall of said enclosure and being fluidly coupled to said interior such that exterior air is forced into said lower compartment of said second area, through lower portions of said wet filters into said first area then through upper portions of said wet filters and each of said dry filters and exiting through said duct aperture.

16. An air filtering apparatus for purifying air, said apparatus comprising:
    an enclosure for coupling to ducting of a ventilation system, said enclosure having an interior, said enclosure having a top wall, a bottom wall, a pair of side walls, a first end wall, and a second end wall, said walls defining said interior;
    a plurality of filters for extracting impurities from air passing therethrough, said plurality of filters comprising a first wet filter, a second wet filter, and a pair of dry filters, each of said filters being positioned in said interior of said enclosure and being oriented generally parallel to said end walls;
    a pair of pump members for supplying water from an enclosure reservoir to each of said wet filters, each of said pump members being mounted on said bottom wall of said enclosure and being positioned in said interior, said pump members being submersed in said enclosure reservoir and being fluidly coupled to said wet filters;
    a supply assembly for supplying water to said enclosure reservoir in said interior, said supply assembly being mounted on said bottom wall of said enclosure;
    a drain assembly for draining said enclosure reservoir, said drain assembly being mounted on said bottom wall of said enclosure;
    a fan member for forcing exterior air through each of said filters and outwardly through a duct aperture in said first end wall;
    a control assembly for controlling each of said pump members and said drain assembly to coordinate a purge sequence of said enclosure reservoir;
    said enclosure including a partition wall being attached to and extending between said side walls, a first end of said partition wall being attached to said first end wall at a point between said duct aperture and said fan member and extending towards said second end wall and being angled downwardly towards said bottom wall to facilitate drainage of the water to said enclosure reservoir;
    each of said wet filters extending between said bottom wall, said top wall, and said side walls, said first wet filter being centrally positioned between said end walls and defining a first area and a second area of said interior;

a second end of said partition wall being mounted on said first wet filter such that an upper compartment and a lower compartment in said second area of said interior are defined;

said second wet filters being positioned between said first wet filter and said second end wall;

each of said wet filters having an upper portion being positioned above said partition wall and a lower portion being positioned below said partition wall;

each of said wet filters including a dispersing member for injecting the water from said pump members into a top end of said wet filters;

one each of said dispersing members being mounted on and extending across said top end of said wet filters, each of said dispersing members comprising an elongate tubular member having a plurality of filter apertures for permitting the water to pass downwardly through to each of said wet filters;

wherein a continuous flow of water passing downwardly through each of said wet filters facilitates the purification of the air passing therethrough when impurities become attached to water particles and filter membrane while simultaneously moving the impurities downwardly out a bottom end of each of said wet filters and into said enclosure reservoir such that each of said wet filters remains generally cleansed;

each of said dry filters extending between said top wall, said side walls, and said partition wall and being positioned in said upper compartment of said interior;

said supply assembly comprising an inlet valve and a float member, said inlet valve being fluidly coupled to a water supply, wherein water from the water supply is permitted to pass through said inlet valve until said float member biases said inlet valve into a closed position when a predetermined water level of said enclosure reservoir in said interior is reached;

said drain assembly comprising an outlet valve and an actuator member for selectively actuating said outlet valve, said outlet valve being fluidly coupled to a drain tube, said actuator member being operationally coupled to said outlet valve and being electrically coupled to said control member;

wherein when said actuator member is actuated, said outlet valve is biased into an open position permitting said enclosure reservoir to drain;

said drain assembly including an overflow member for draining excess water in the enclosure reservoir, said overflow member being mounted to said outlet valve and being in fluid communication with the drain tube;

wherein said enclosure reservoir is drained upon periodic activation of said drain assembly for the purpose of purging accumulated impurities from each of said wet filters then is automatically re-supplied by said supply assembly; and said fan member being mounted on said second end wall of said enclosure and being fluidly coupled to said interior such that exterior air is forced into said lower compartment of said second area, through lower portions of said wet filters into said first area then through upper portions of said wet filters and each of said dry filters and exiting through said duct aperture.

17. The apparatus of claim 16, further comprising:

a first sprinkler assembly fluidly coupled to said supply assembly, said first sprinkler assembly being positioned on an interior surface of said enclosure, said first sprinkler system spraying water into a portion of said enclosure ahead of said first wet filter for capturing particulate material and cleaning said walls and said filters; and a second sprinkler assembly fluidly coupled to said supply assembly, said second sprinkler assembly being positioned on an interior surface of said enclosure, said second sprinkler system spraying water into a portion of said enclosure behind a last one of said plurality of wet filters for capturing particulate material and cleaning said walls and said filters.

18. An air filtering apparatus for purifying air, said apparatus comprising:

an enclosure for coupling to ducting of a ventilation system, said enclosure having an interior, said enclosure having a top wall, a bottom wall, a pair of side walls, a first end wall, and a second end wall, said walls defining said interior;

a plurality of filters for extracting impurities from air passing therethrough, said plurality of filters comprising a first wet filter, a second wet filter, and a pair of dry filters, each of said filters being positioned in said interior of said enclosure and being oriented generally parallel to said end walls;

a pair of pump members for supplying water from an enclosure reservoir to each of said wet filters, each of said pump members being mounted on said bottom wall of said enclosure and being positioned in said interior, said pump members being submersed in said enclosure reservoir and being fluidly coupled to said wet filters;

a supply assembly for supplying water to said enclosure reservoir in said interior, said supply assembly being mounted on said bottom wall of said enclosure;

a drain assembly for draining said enclosure reservoir, said drain assembly being mounted on said bottom wall of said enclosure;

a fan member for forcing exterior air through each of said filters and outwardly through a duct aperture in said first end wall;

a control assembly for controlling each of said pump members and said drain assembly to coordinate a purge sequence of said enclosure reservoir;

a first sprinkler assembly fluidly coupled to said supply assembly, said first sprinkler assembly being positioned on an interior surface of said enclosure, said first sprinkler system spraying water into a portion of said enclosure ahead of said first wet filter for capturing particulate material and cleaning said walls and said filters; and a second sprinkler assembly fluidly coupled to said supply assembly, said second sprinkler assembly being positioned on an interior surface of said enclosure, said second sprinkler system spraying water into a portion of said enclosure behind a last one of said plurality of wet filters for capturing particulate material and cleaning said walls and said filters.

19. The apparatus of claim 1, further comprising at least one sprinkler assembly fluidly coupled to said supply assembly, said first sprinkler assembly being positioned on an interior surface of said enclosure, said first sprinkler system spraying water into a portion of said enclosure for capturing particulate material and cleaning said walls and said filters.

* * * * *